June 3, 1958     M. J. E. GOLAY     2,837,736
RADIO INTERFEROMETRY

Filed Feb. 8, 1955     2 Sheets-Sheet 1

INVENTOR,
MARCEL J. E. GOLAY.
BY
Harry M. Saragovitz
ATTORNEY.

United States Patent Office
2,837,736
Patented June 3, 1958

2,837,736

RADIO INTERFEROMETRY

Marcel J. E. Golay, Rumson, N. J.

Application February 8, 1955, Serial No. 487,002

1 Claim. (Cl. 343—12)

(Granted under Title 35, U. S. Code (1952), sec. 266)

The invention described herein may be manufactured and used by or for the Government for governmental purposes, without the payment of any royalty thereon.

This invention relates to high precision electronic range measurements. The objects of the invention include the simplification of the techniques now used and a considerable increase in accuracy and reliability.

Heretofore it has been well known to transmit a pulse of high frequency energy from one point to another, return it by reflection or retransmission at the same or a different frequency, and measure the delay between the pulses as a measurement of range, either by a precise time measurement or by circulating the original pulse back and forth between the stations and measuring the pulse repetition rate. Each pulse must involve a substantial number of high frequency cycles and the probable error in measurement is of the order of several wavelengths of the high frequency, depending partly on the sharpness of the pulse.

It is also common to transmit energy in the form of a wave of known frequency between such points, necessarily returned at a different frequency to avoid confusion between transmitted and returned signals, but with an identifiable phase relation, and to compare the phase of transmitted and returned signals to determine (1) the relative velocity between such points by gradual change in phase or (2) the fractional wavelength at said frequency of the round trip distance between such points, but with an ambiguity as to the whole number of wavelengths. To resolve this ambiguity, a number of accurate phase determinations at different frequencies may be found to be mutually consistent with only one distance between the two points within the known limits of this distance. As the distance increases the number and necessary precision of phase measurements to resolve the ambiguity may become impractical, or at best cumbersome. Sometimes it may be possible to traverse the distance between the points at which emission takes place, or between other points of known location, and actually count the whole number of wavelengths traversed by counting the number of phase rotations of the signal, within a system of real or virtual standing waves set up by emission from two or more points, but this procedure is obviously limited in use by the conditions such as terrain, required speed of measurement, economic consideration, etc.

This invention accomplishes in effect the counting of the whole and fractional number of wavelengths between points by transmitting to and receiving from a distant station continuous wave signals, modifying their frequency either gradually or suddenly, and, during the entire period of change until the modified frequency has completed the round trip between the points, accurately counting the number of complete and fractional phase rotations between the transmitted and received signals. Such phase rotations are caused by the change in frequency, the system being so designed that the transmitted and received signals are of the same frequency when their frequencies and the distance between said stations are not varied, and when the effect of any former frequency change has been allowed to subside.

In order to provide a check on any accidental miscount it may be desirable to make the frequency change in several ascending and descending steps and compare the phase rotations accomplished at each step. In this way any needed corrections can be made or the operation may be repeated until consistent results are obtained. In cases where an unusually large fraction of the power received at either station has travelled over other than the line of sight path between stations, additional precautions and refinements of the main technique may be required which will be also described. The accuracy of this method is so high that it becomes worthwhile to include in the final calculations any changes in characteristics of circuit components such as antenna, transmission lines, etc. which may affect the apparent measurements of the distances involved.

Since the number of phase rotations represents the difference between the original number of wavelengths and the new number of wavelengths in which the round-trip distance can be expressed, and since said wavelengths are substantially inversely proportional to the frequency when the medium of transmission is the atmosphere, it becomes apparent that the distance is directly proportional to the number of whole and fractional phase rotations, and inversely proportional to the frequency difference. To eliminate the effects of any slight differences in propagation rate at various frequencies and for certain atmospheric conditions of air density and absolute humidity, the "wave numbers," as they are known, may be used instead of the frequencies; such wave numbers correspond to the reciprocal of the wavelength and are measured in units of $cm.^{-1}$.

The particular manipulation depends largely on the nature of the components used in making the measurements; for example, electronic devices involving little delay can handle sudden changes without substantial difficulty, while electromechanical devices having appreciable inertia may be operated with a view to the limitations inherent in such inertia. Although the phase rotations might be counted by visual inspection, it would be quite common to have very rapid rotations which might make it impractical or even impossible to count the rotations visually, thus requiring some form of counter responsive to actual rotations of the electromechanical type of phase meter, and even possible to have phase rotations which exceed the operative limits of the particular phase meter. Even if the actual phase rotations were of moderately low value, phase meters are often most effective only at a moderately low frequency of the input. For these reasons the reference and variable frequencies may be converted in such a way that a device similar to a phase meter, using D. C. on one of the windings, or even a permanent magnet, may be used to indicate the actual phase at the beginning and end of the period in question. The same signals supplied to this phase meter may also be used to control a binary reversible counter, with the further advantage of counting phase changes far more rapidly than this could be done either visually or by electromechanical phase meters. Since variations in these signals indicate both the existence and the direction of phase rotation, and therefore are used to establish both the act and the direction of counting, it is desirable that the binary counting circuit should be controlled as to both operation and direction by the same pulses. Therefore reversible binary counters in which the direction of counting is reckoned are desirable for the sake of the convenience afforded when changing the direction of frequency variation for checking purposes. Ancillary to the broad invention claimed here, a reversible binary counter which has certain advantages over reversible electronic binary counters already known in the art will also be described and claimed.

Other objects of the invention will become apparent and the invention will be more fully understood from the detailed description and claims, and the drawings in which:

Figure 1:
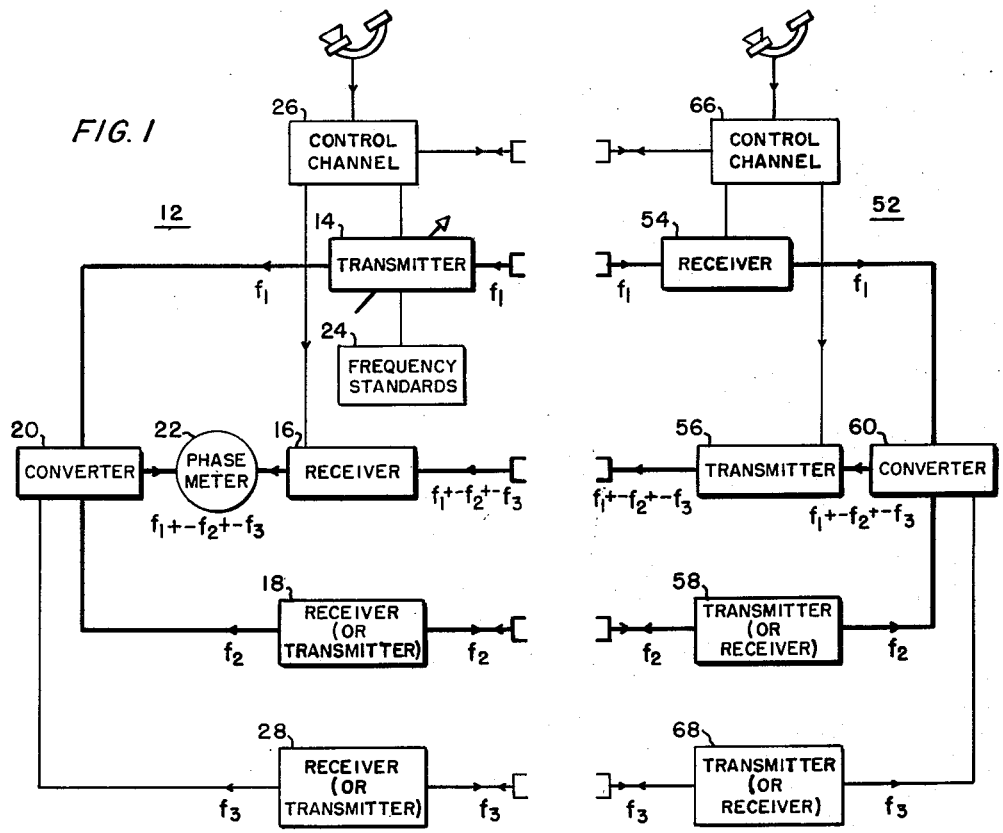
Figure 1 represents one suitable arrangement of components for practicing the invention, including auxiliaries found to be desirable under certain circumstances shown in lighter lines than the basic arrangement.

In Figure 1 the measuring station 12 includes a transmitter 14 which can send a continuous wave signal $f_1$ accurately controlled to two or more frequencies $f_{1b}$ to $f_{1g}$, etc., and variable between such frequencies without loss of phase continuity. The transponder station 52 includes a receiver 54 for such continuous wave signal and a transmitter 56 for returning to the receiver 16 at station 12 a continuous wave signal which is coherently related to the signal transmitted by 14 and received by 54. When the measurement to be made involves an electrical length over a wire circuit, or the transmitted and returned signals may be otherwise separated in some manner, it is possible to transmit and receive on the same frequency. In most cases of distance measurement in space it is entirely impractical to receive and return a signal of the same frequency and therefore some means must be provided to convert the frequency and yet retain some reliable indication of the phase. This is shown as an auxiliary channel operating at frequency $f_2$ including transmitter (or receiver) 58 at station 52 and receiver (or transmitter) 18 at station 12 to assure accurate identification of the phase relations of the signals, and similar converters 20 and 60 at both stations are used to provide continuous wave signals of similar frequencies, the relative variable phase of which can be shown on any phase meter such as 22 at station 12.

As shown the frequencies applied to phase meter 22 would be $f_1 \pm f_2$ (as modified by changes in value of $f_1$, path length, etc.) although the operation would be the same if the received signal were converted to the frequency $f_1$ instead.

Where extreme accuracy is not essential it may be possible to use highly stable oscillators at both stations instead of actually synchronizing the two stations by transmitting from one to the other; in this case a steady reading would be compared to the reading resulting from change in frequency $f_1$ to determine the range, assuming stability of the components during the readings.

For reasons to appear later the phase meter includes means for measuring the amplitudes of each of the vector components of the received signals as well as the phase indicated by their relative values.

If there is a substantially continuous signal transmitted, but a break occurs in the phase continuity, for many purposes the ultimate error resulting from a misreading of one or two phase gyrations may not be objectionable. It will be noted that the same general arrangement can also be used for counting the rate of phase rotations between stations, caused by a real or virtual (atmospheric) relative velocity, as already indicated in discussing previous systems: for this application the means for varying frequency would not be needed.

Depending on the nature of the actual measurements to be made, it may be worthwhile to modify the basic system shown in heavy lines in Fig. 1, by the addition of components such as those shown in light lines, or to use the system as an element of a more comprehensive system, for example:

(1) To accurately establish the operating frequencies of the transmitter it is convenient to have standard frequency sources to which the operating frequencies may be selectively locked. Such a means is indicated by 24 in Fig. 1.

(2) To modify the operation of both stations at substantially the same time for such purposes as frequency control, thus permitting reception within a narrower bandwidth than would otherwise be practical, it is convenient to provide a control channel with any necessary servo-mechanisms, which would normally be controlled from the measuring station 12, but might include answer-back data from transponder station 52. Such means are indicated by 26 and 66 in Fig. 1.

(3) The signal received at the far station is ordinarily strong enough to avoid interference by any modulation product of the two emitted signals $f_1$ and $f_2$, which is in proportion to the quadratic distortion of the receiver; however, with a second auxiliary channel operating at frequency $f_3$, also used in the converter, the possibility of any effect on the receiver can be still further reduced, as any interference with the incoming signal can then be due only to a cubic distortion of the receiver. Such means are indicated by 28 and 68 in Fig. 1. In the case of transmission of three measuring signals by the distant station 52, the stability of the generators of the auxiliary frequencies $f_2$ and $f_3$ is not critical, as slight accidental changes in these frequencies will only cause a slight detuning of the receivers, while the relative phase of the signals compared to each other in the phase meter will not be affected. On the other hand, if the auxiliary signals of frequency $f_2$ and $f_3$ are generated at the measuring station, it will be essential that the frequencies of these signals have a high degree of stability, as any slight accidental change of these frequencies will cause a definite phase error as a result of the round trip over which these frequencies are made to travel.

(4) To extend the operation from range finding to position finding the technique may be used in systems involving multiple pairs of measurements from a plurality of fixed points establishing a family of curves which can be analyzed to determine the position. Since the application of this invention to such a network involves no new problems, although the network operation is itself very complex, no attempt has been made to analyze it herein. Those familiar with such networks can readily adapt the present invention thereto.

Figure 2:
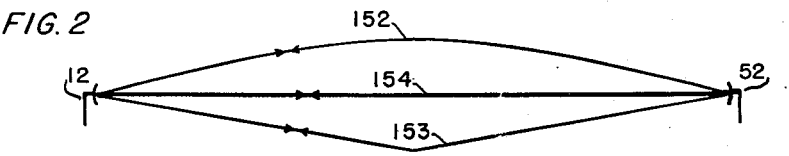
Figure 2 illustrates the propagation of signals over a path other than a line-of-sight path.

It will be noted that the basic method described above is essentially predicated on the assumption that there is but one path for the propagation of radio waves between the two stations, namely the "line of sight" path. There may, however, be additional propagation paths due for instance to reflections of the radio waves by the ground, or to refraction of the radio waves by large air density and/or moisture gradients. These other paths have been illustrated as paths 152 and 153 in Fig. 2. In the discussion of the method for treating these cases which follows, it will be assumed that the sought radio distance between the two stations 12 and 52 is the distance of the shortest path, D, illustrated as path 154 in Fig. 2, although it will be recognized that conditions may exist, in which path 152, shown as geometrically longer than path 154, corresponds actually to a shorter radio distance.

Multipath propagation will require a more elaborate treatment of the data obtained than has been described heretofore, as knowing the number of turns of a phase meter 22 and the phase value exhibited by such meter at the beginning and the end of the run, may not be sufficient to yield a correct value for the radio distance between the stations. It will be necessary, instead, to observe the vector amplitude and phase values exhibited by the vector component indicators of phase meter 22 at a number of intermediate values in $f_{1a}$ to $f_{1g}$ frequency interval, and to process these values in the manner to be described.

The required treatment of these data may be best understood by considering initially the meaning of the data obtained when there is but one propagation path. If, under these circumstances, the output of phase meter 22 is observed at chosen frequency intervals $\Delta f_1$, the double radio distance, 2D, multiplied by $$\frac{\Delta f_1}{c}, \text{ that is } 2D\frac{\Delta f_1}{c}$$

equals the phase rotation intervals $\Delta N$. For convenience in analysis $\Delta f_1$ is so chosen that $\Delta N$ is nearly an integral number, $n$, augmented or diminished by a small fraction, $e$, and the successive values of these observed outputs will be proportional to $\sin 2\pi (me+e_b)$, where $m$ designates the $m$th integer value at which a frequency $f_{1b}+m\Delta f_1$ is utilized, and $e_b$ designates the fractional cycle observed at the frequency of $f_{1b}$. If now a Fourier analysis is made of the plots of the successive values of the dual inputs to the vector component indicators of phase meter 22 against integers $m$, since pure sine curves are formed by such plots a single spectral line will be obtained, the "frequency" $e$ relative to $m$ (not time) being determined in magnitude and sign by the dual outputs. This "frequency," the measure of which is a dimensionless fractional number, will constitute a correction to be applied to the number $\Delta N$ of phase counts observed during most partial runs through the frequency intervals $\Delta f$.

Assume now that a second propagation path exists, longer than the first by the amount $\Delta D$, and that the amplitude of the signal received over it at the far station is $a$ times the amplitude received over the shorter path. After its return to the measuring station over the shorter path, the contribution of this signal to the values registered by meter 22 will be $$a \sin 2\pi\left[m\left(e+\frac{\Delta D \Delta f_1}{c}\right)+e_b\right]$$

and $$a \cos 2\pi\left[m\left(e+\frac{\Delta D \Delta f_1}{c}\right)+e_b\right]$$

An equal contribution will be obtained from the signal received at the far station over the shorter path and returned to the measuring station over the second path, the toal amplitudes being $2a$. A third contribution will be made by the signal transmitted and received over the second path, having components $$a^2 \sin 2\left[m\left(e+2\frac{\Delta D \Delta f_1}{c}\right)+e_b\right]$$

and $$a^2 \cos 2\pi\left[m\left(e+2\frac{\Delta D \Delta f_1}{c}\right)+e_b\right]$$

the amplitude of the signal being $a^2$. If now a similar Fourier analysis is made of the successive values given by phase meter 22, it will be apparent that a "spectrum" will be obtained, which consists of a line of "frequency" $e$ and of amplitude normalized to unity, of a second line of "frequency"

$$e+\frac{\Delta f_1 \Delta D}{c}$$

and of amplitude $2a$, and of a third line of "frequency"

$$e+2\frac{\Delta f_1 \Delta D}{c}$$

and of amplitude $a^2$, and that the positive or negative character of these "frequencies" will be determined by the duality of their observed Fourier transforms. It will be further noted that the spectrum obtained is a "squared" spectrum, and, if several alternate propagation paths are present, characterized by incremental distances $\Delta D_k$ and reflection (or propagation) coefficients $a_k$, the vectorial signals observed will be given by the expression:

$$[1+\sum a_k e^{(2\pi jm\Delta f_1 \Delta D_k)}]^2$$

In the Fourier analysis, the smallest "frequency" will correspond to the desired shortest radio distance. The reconstruction of this spectrum in vectorial form will indicate whether the multipath transmission can cause errors in the number of phase counts registered by the counters. For instance, in the case of only one alternate path with a reflection (or propagation) coefficient $a$, which was considered above, it will be apparent that no false counts will have been given when a $<1$, whereas corrections should be introduced for the case when a $>1$.

It will be also noted that the treatment of multipath propagation given above, in which the effect of these multipaths are treated as a virtual squared spectrum, is mathematically analogous to the treatment of the visibility curve obtained with a Michelson interferometer to obtain the fine structure of spectral lines, which Michelson has discussed in his treatise, "Studies in Optics," University of Chicago Series 1927.

Figure 3:
Figure 3 is a vector diagram illustrating the effect of propagation over such a path.

Fig. 3 is a vectorial representation of the "main signal" transmitted and received over the shorter path, of the double contribution of the signals propagated in one direction over the shorter path and in the other over the longer path, and of the contribution of the signal propagated in both directions over the longer path. It will be noted that the angles between the successive pairs of vectors are equal and their relative magnitudes are proportional to 1, $2a$, and $a^2$. The signal actually observed will be the resultant of these three signals, the two projections of which are given by the deflections by the vector component indicators of meter 22.

Figure 4:
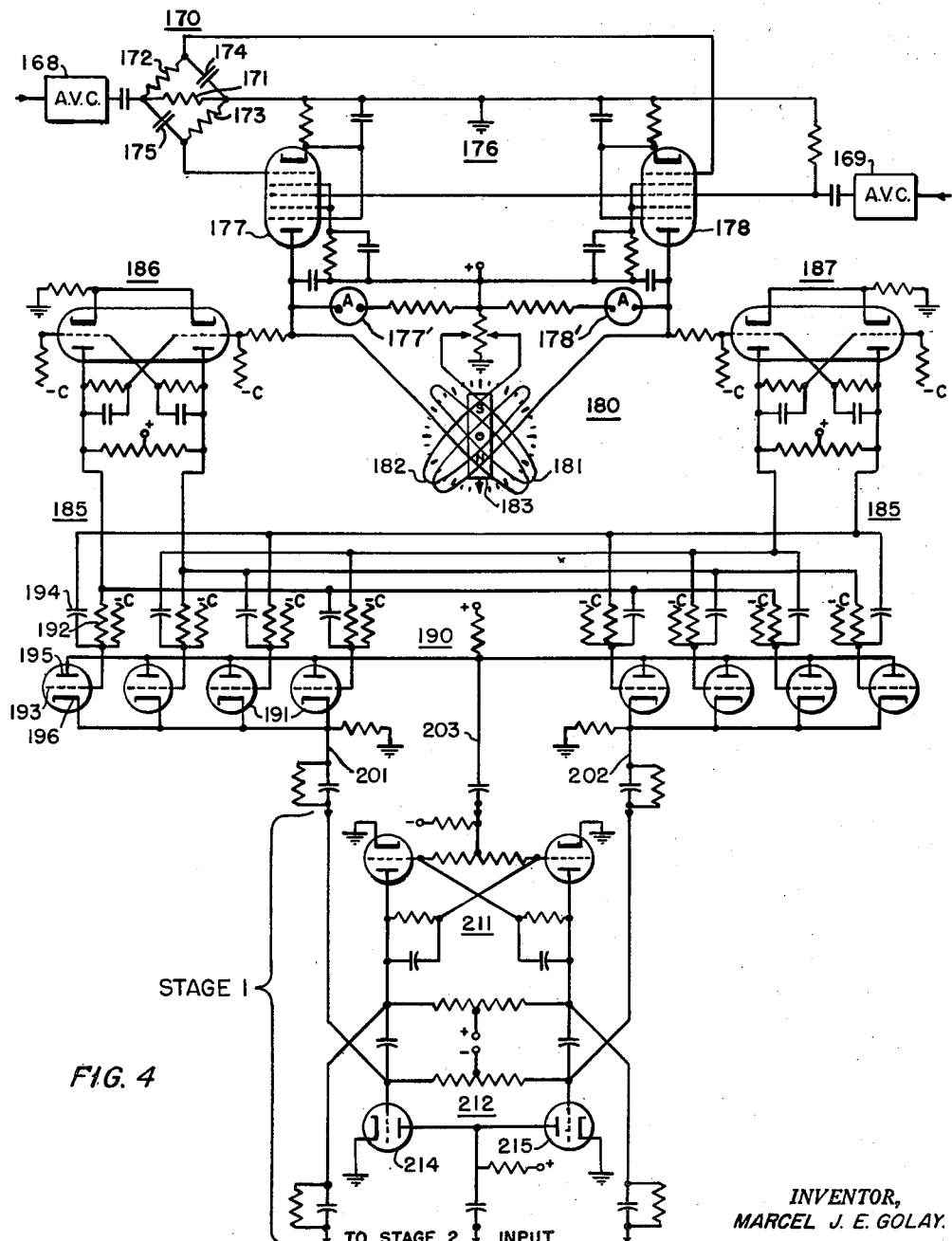
Figure 4 represents a phase responsive circuit particularly suited to practice the invention.

A particularly suitable form of phase rotation counter is illustrated in Fig. 4, in which a reference frequency source and a variable frequency source are combined to indicate the actual phase relation.

The reference frequency is first supplied through automatic volume control 168 to a conventional 90° phase splitting network, 170, having a grounding resistor 171, two resistive arms, 172 and 173, and two capacitive arms, 174 and 175, of equal impedance at the reference frequency. The outputs of this phase splitting network each differ by 45° in phase from the actual reference frequency but in opposite directions, and therefore the total phase difference in the two outputs is 90°. These two outputs are each combined with the variable frequency as applied through automatic volume control circuit 169 in a mixer detector stage, 176, which may include, in the respective channels, pentagrid mixers 177 and 178. The outputs of each mixer, therefore, will provide a signal at the difference frequency with maxima corresponding to inputs of the same phase to that mixer; since the mixers have reference frequency inputs displaced 90° in phase and variable frequency inputs of the same phase, the outputs of the mixers will have their maxima displaced 90° in phase also. When the variable and reference frequencies are the same the difference frequency will be zero but the phase relation will still be apparent in the relative D. C. values of the outputs of the mixers in the respective channels shown on meters 177' and 178'. Since the phase splitting network provides a 90° phase difference in the inputs to the first and second channels, the D. C. outputs of the detectors will be proportional to the sine and cosine, respectively of the phase angle between the variable frequency input and reference frequncy input to the first channel. It will be understood that this reference frequency input is displaced 45° from the actual reference frequency, but since all calculations are relative this does not cause any difficulty. The original phase angle can therefore be indicated by a device 180 in the nature of a phase meter having its two crossed coils 181 and 183 connected to the respective mixer outputs and a D. C. energization for the relatively movable single coil or a permanent magnet 183 replacing such single coil. The automatic volume control circuits may be disabled while determining the separate vector values of Fourier analysis.

This phase meter will be found adequate for showing the original and final phase relations of the signals, and relatively slow phase rotations. However, in order to count rapid phase rotations the inputs to the phase meter also should be converted into digital form and used to operate a suitable digital computer. The digital computer ordinarily would be controlled by polarity reversals of the sine and cosine components, but the direction of such reversal and the polarity of the other component at the time must be coordinated to establish the direction of phase rotation, which may be represented by the product of the algebraic signs of the derivative of the sine component when it is changing and the value of the cosine, or the derivative of the cosine component when it is changing and the value of the sine with its algebraic sign reversed; an analyzer 185 must be provided so that the phase changes will cause the reversible counter to be operated in the proper direction. The sine wave outputs of each mixer detector are therefore converted into square waves by any suitable "decider" circuit, such as bi-stable multivibrators 186 and 187. These square wave outputs are then converted to binary form by the coincidence circuit 190 in which it will be seen that each of tubes 191 serves as "and" gate responsive to a positive polarity existing in one side of the output of one of the "decider" circuits connected by resistors 192 to the grids 193, and a positive changing pulse voltage in one side of the output of the other "decider" connected by condenser 194 to the proper grids 193. As illustrated the anodes 195 are all connected together to give count pulses of negative polarity on output 203 and the cathodes 196 of the add and subtract tubes at the same time provide separate positive directional pulses for the add and subtract outputs 201 and 202. The relative connections to the add and subtract sides of the coincidence circuits must be carefully chosen to correspond to the direction of change of voltage in each "decider" and the stable voltage in the other "decider," corresponding to the chosen relation in the direction of phase rotation and the direction of counting. Therefore the analyzer outputs will involve a series of positive directional pulses on the add or subtract sides of the output circuits 201 and 202, and at the same time a count pulse of negative polarity on output circuit 203, to be fed to the "carry" component and binary component respectively of stage I of the counter.

It will be apparent that the bistable multivibrator comprising the usual binary component 211 of the first stage of the counter must be operated to change state with either add or subtract pulses, but the "carry" component 212 to provide, for the next stage, "carry" pulses, corresponding to the count pulses of the first stage, to change the state in the further stages of the computer is to be operated only when the direction of change in the binary component and the direction of counting inputs from the analyzer correspond to a condition under which such stages should be operated. Therefore the "carry" component of the first stage serves, in effect, as a complex "and" gate combining the directional input to the stage and the actual direction of operation of the binary component of that stage, to provide a count or "carry" pulse input for the next stage if proper. The "carry" component may include a pair of gate tubes 214 and 215 so biased that positive control pulses from the binary component corresponding to the direction of the change in state and further positive input pulses over leads 201 and 202, corresponding to the direction of counting, are both necessary to operate either gate tube. Since only one of the directional counting inputs can be positive, and only one of the control pulses can be positive, each gate tube can operate only on approximately one-half of the adding pulses and the other only on approximately one-half of the subtracting pulses; either tube 214 or 215 operates only when (1) it receives a positive direction pulse over respective input leads 201 or 202 of the stage and (2) it also receives a positive pulse due to a proper direction of change in state of the binary component 211; the latter presupposes that there must have been a count pulse over input lead 203 to cause the change in state, and that its previous state would be such as to provide the proper polarity of pulse resulting from the change. When either tube 214 or 215 of the "carry" component of a stage is energized, a count or "carry" pulse is sent on to the next stage; in any event the direction of change in state of the binary component in a first stage is transmitted over the add and subtract leads 201, 202 from the binary component of that stage into the "carry" component of the next stage, but can have no effect unless the state of the binary component of such next stage is changed, and the change is in the proper direction. It will thus be seen that the add or subtract input to the "carry" component of each stage and the count input, if any, to that stage propagate together down through the various stages as far as a stage where the "carry" component does not function; since the pulses are formed in each stage and used in the same or the next stage, there is no chance for them to become separated in time during propagation through a multi-stage counter. In case of a rapidly following count pulse in either direction the only requirement to prevent miscounting is that each of the two counting pulses should be separated in propagation through the various individual stages; therefore several counting pulses may be simultaneously propagating through a multi-stage counter without any interference. It will be noted that in the first stage both count and direction signals are pulses, while in latter stages the count or "carry" signal is of pulse form, but the direction signal may have a sustained value. This difference does not substantially affect the operation although minor readjustments of such matters as operating biases may be necessary.

A preferred embodiment of the invention has been described to facilitate an understanding of the invention, but many variations will be apparent to those skilled in the art. What is claimed is:

Apparatus for measuring distance between a first and a second point comprising a continuous wave transmitter at said first point operable at a frequency which can vary between two known values, a receiver, converter, and transmitter at said second point to return a signal of a different frequency but with an identifiable phase relation, a receiver at said first point for such signal of different frequency, a converter at said first point synchronized to said first converter to provide from said transmitted and returned signals two signals of the same frequency, and a phase responsive means for counting the relative whole and fractional phase rotations of said transmitted and returned signals caused by a shift of said transmitter from one to the other of said two known frequencies, said phase responsive means comprising a phase shift network connected to the source of one of said two signals of the same frequency to provide two outputs of said frequency but of different phase, two frequency converters each energized by one of said outputs and both energized by the source of the other of said signals to provide two outputs of frequency and phase corresponding to the difference between the energizing voltages, and a low frequency indicator responsive to the relative instantaneous values of the two outputs, and further including a translator for converting changes in the instantaneous values of said two outputs corresponding to each change in quadrant of phase rotation, to directional pulses on second or third input leads of a binary computer stage depending on the direction of such change in phase rotation, and a count pulse on a first input lead to such computer simultaneously with a pulse on either said second or third input lead, said computer comprising a plurality of stages each having first, second, and third input leads and three corresponding output leads, a bistable circuit successively shiftable between a first and a second state responsive to each count pulse signal received over said first input lead, a "carry" circuit comprising first and second "and" gates, said first "and" gate being responsive to a shift of said bistable circuit from said first state and a signal received over said second input lead, said second "and" gate being responsive to a shift of said bistable circuit from said second state and a signal received over said third input lead, said first output lead being energized by a pulse generated by either "and" gate to cause a "carry" pulse serving as a count pulse in the bistable circuit of the next stage, said second output lead being energized by said bistable circuit of said stage in said second state, and said third output lead being energized by said bistable circuit of said stage in said first state, whereby the distance may be determined by the number of phase rotations and the difference in frequencies at which said transmitter at said first point is operated.

References Cited in the file of this patent

UNITED STATES PATENTS

| | | |
|---|---|---|
| 1,750,668 | Green | Mar. 18, 1930 |
| 2,169,374 | Roberts | Aug. 15, 1939 |
| 2,198,113 | Holmes | Apr. 23, 1940 |
| 2,537,574 | Crosby | Jan. 9, 1951 |
| 2,604,004 | Root | July 22, 1952 |
| 2,656,106 | Stabler | Oct. 20, 1953 |
| 2,735,005 | Steele | Feb. 14, 1956 |